United States Patent
Kawachi et al.

(10) Patent No.: US 6,720,018 B2
(45) Date of Patent: Apr. 13, 2004

(54) METHOD FOR PRODUCING MILK CALCIUM COMPOSITION

(75) Inventors: Yasuji Kawachi, Kawagoe (JP); Toshihiro Kawama, Kawagoe (JP); Kaoru Sato, Kamifukuoka (JP); Akira Tomizawa, Iruma (JP)

(73) Assignee: Snow Brand Milk Products Co., Ltd., Hokkaiko (JP)

( * ) Notice: Subject to any disclaimer, the term of this patent is extended or adjusted under 35 U.S.C. 154(b) by 0 days.

(21) Appl. No.: 09/835,730

(22) Filed: Apr. 16, 2001

(65) Prior Publication Data

US 2002/0025361 A1 Feb. 28, 2002

(30) Foreign Application Priority Data

Apr. 21, 2000 (JP) ........................................ 2000-120272

(51) Int. Cl.$^7$ .............................. C12H 1/04; A23L 1/30
(52) U.S. Cl. .......................... 426/422; 426/74; 426/580
(58) Field of Search ......................... 426/74, 580, 422, 426/34, 41, 583

(56) References Cited

U.S. PATENT DOCUMENTS

| 4,202,909 A | 5/1980 | Pederson, Jr. |
| 5,330,773 A | 7/1994 | Piliero et al. |
| 5,912,032 A * | 6/1999 | Komatsu et al. ............... 426/74 |

FOREIGN PATENT DOCUMENTS

| EP | 0 225 770 | 6/1987 |
| EP | 0 741 976 | 11/1996 |
| EP | 1 025 762 | 8/2000 |
| EP | 1 031 288 | 8/2000 |
| JP | 60-248152 | 12/1985 |
| JP | 05 339160 | 12/1993 |
| NZ | 235694 | 7/1995 |
| NZ | 278018 | 4/1998 |
| WO | WO 96/23417 | 8/1996 |

* cited by examiner

*Primary Examiner*—Leslie Wong
(74) *Attorney, Agent, or Firm*—Knobbe, Martens, Olson & Bear LLP

(57) ABSTRACT

A milk calcium composition which is highly dispersible and tasty can be obtained by adjusting the pH of a permeate containing lactic acid and lactic acid ion, which was obtained by treating whey with a UF membrane or NF membrane, to recover milk calcium as a slurry-like precipitate and then admixing this milk calcium with milk proteins.

4 Claims, No Drawings

METHOD FOR PRODUCING MILK CALCIUM COMPOSITION

BACKGROUND OF THE INVENTION

1. Field of the Invention

The present invention relates to a method for producing a milk calcium composition which is highly dispersible and tasty, and to a calcium-fortified drink or food product with which this milk calcium composition is admixed.

2. Description of the Related Art

Calcium in milk is drawing attention as a source of high quality, highly absorbable calcium. However, the conventional isolation and purification of calcium from milk for admixing with a drink or food product produces an insoluble calcium phosphate precipitate, which causes a marked deterioration in the quality of the drink or food product. Furthermore, calcium phosphate has an unfavourable taste, which also causes a deterioration in the quality of the drink or food product in terms of taste. Under these circumstances, there are demands to develop calcium materials which are derived from milk and which are highly dispersible, for which various attempts are being made.

Examples of conventional methods for producing such calcium materials derived from milk include a method in which whole milk or skimmed milk is acidified or treated with rennin to remove casein by coagulation and precipitation, the resultant whey or supernatant is treated with a UF membrane to recover a permeate, and then the permeate is neutralized to obtain a calcium component as a precipitate (Japanese Patent Publication No. H3-24191) and a method for producing a calcium component for calcium-fortified drinks, in which the proteins in whey are removed by treating with an ion exchange resin or a UF membrane, then the lactose is crystallized and the solution is concentrated using a UF membrane or microfiltration (MF) membrane in a neutral range to obtain a whey mineral component having a calcium content of 2–8% by weight (Japanese Patent Application Laid-open No. H9-23816).

However, the milk-derived calcium materials thus obtained were not satisfactory as calcium materials to admix with drinks or food products since they were poorly soluble and dispersible, and had an undesirable taste.

SUMMARY OF THE INVENTION

In view of the problems in the abovementioned prior art, an object of the present invention is to provide a method for producing a milk calcium composition which is highly dispersible and tasty. Another object of the present invention is to provide a calcium-fortified drink or food product with which the milk calcium composition obtained by this method is admixed.

In the course of an intensive study to resolve the above-mentioned problems, the present inventors found that a milk calcium composition which is highly dispersible and tasty could be obtained by adjusting the pH of a permeate containing lactic acid and lactic acid ion, which was obtained by treating whey with a UF membrane or NF membrane, to recover milk calcium as a slurry-like precipitate and then admixing this milk calcium with milk proteins. The present invention was thus accomplished.

DETAILED DESCRIPTION OF THE PREFERRED EMBODIMENT

In the present invention, a permeate containing lactic acid and lactic acid ion, which is obtained by treating whey with a UF membrane or NF membrane, is any one of the following: (1) a permeate obtained by treating lactic acid whey with a UF membrane or NF membrane, (2) a permeate obtained by treating whey, to which lactic acid or a lactate is added, with a UF membrane or NF membrane, and (3) a solution in which lactic acid or a lactate is added to a permeate obtained by treating whey with a UF membrane or NF membrane.

Whey to be treated with a UF membrane or NF membrane can be either acid whey, cheese whey, lactic acid whey obtained by lactic acid fermentation of milk, or the like. However, acid whey having a high calcium content is preferable because calcium can be recovered in a high concentration. Lactic acid whey is also preferable because there is no need to add lactic acid or a lactate to it.

A permeate is obtained by treating whey with a UF membrane or NF membrane. In the present invention, a UF membrane to be used has a cut-off molecular weight of 1,000–500,000, and a NF membrane to be used has a cut-off molecular weight of 100–5,000, which are generally used in the dairy industry. A UF membrane is preferably used since use of a NF membrane reduces calcium permeability. Further, in order to improve calcium recovery upon the pH adjustment in a later step, it is preferable to concentrate this permeate in advance by treating with a reverse osmotic (RO) membrane or MF membrane or by evaporation.

A permeate is poorly dispersible when its lactic acid concentration or lactate concentration, as lactic acid, is less than 0.02% by weight. Therefore, lactic acid or a lactate is preferably added, if necessary, to make the lactic acid concentration or lactate concentration, as lactic acid, of the permeate to be 0.02% by weight or greater. A lactate to be added can be any lactate, such as sodium lactate or calcium lactate, or mixtures containing such lactates including mixtures with lactic acid. In cases where lactic acid whey is used, the addition of lactic acid or a lactate is not necessary since its lactic acid content is 0.02% by weight or greater (lactic acid whey contains about 0.8% by weight of lactic acid).

Lactic acid or a lactate can be added to either whey or a permeate. However, it is preferable to be added to a permeate because the amount of lactic acid to be added is smaller and the concentration is more easily controlled.

The permeate containing lactic acid and lactic acid ion thus obtained is heated and then its pH is adjusted to recover milk calcium as a slurry-like precipitate.

If the temperature upon the pH adjustment is lower than 30° C., lactose simultaneously tends to precipitate so that the purity of milk calcium is reduced and the resulting milk calcium composition is poorly dispersible. If the temperature is higher than 80° C., milk calcium reacts with phosphoric acid to form calcium phosphate so that the resulting milk calcium composition is poorly dispersible and the precipitate is difficult to be recovered. Therefore, the temperature is preferably 30–80° C., most preferably 50° C.

The calcium recovery rate decreases if the pH is below 6.0. The taste deteriorates if the pH is higher than 9.0. Therefore, pH 6.0–9.0 is preferable. For the pH adjustment, alkaline solutions, such as sodium hydroxide, potassium hydroxide, calcium hydroxide, sodium carbonate, and sodium citrate can be used.

Milk calcium thus recovered is highly dispersible presumably because when the pH of the permeate is adjusted to form the milk calcium precipitate, lactic acid and lactic acid ion in whey suppress formation of a hard apatite structure primarily consisting of calcium phosphate through reaction of milk calcium and phosphoric acid.

Then, the recovered milk calcium is mixed with a milk protein component to obtain a milk calcium composition. The milk protein component to be added can be any one of raw milk, skimmed milk, skimmed powder milk, casein materials, whey protein materials, and the like. In cases where powder or solid materials are used, they are added as a solution at an appropriate concentration. Further, presumably, recoagulation of milk calcium is restrained by mixing the slurry-like milk calcium precipitate with a milk protein component and the milky taste is further improved.

A calcium content in the milk calcium composition of less than 2.5% by weight of the total solids has too low quality as a milk calcium composition. If the content is more than 5.0% by weight, milk calcium interacts with milk proteins to cause gelation, which renders the composition poorly dispersible. Accordingly, a content of 2.5–5.0% by weight is preferable.

Since the sodium content in a milk calcium composition has a great effect on the taste, it is desirable that it be of an amount such that log (amount of calcium/amount of sodium) $\geq 0.9$. The milk calcium composition thus obtained can be used without further processing. Also, it can be frozen to produce a frozen product, or spray-dried or freeze-dried to produce a powdered product to be used as a milk calcium composition.

Since a milk calcium composition obtained in the present invention is highly dispersible and tasty, it can be admixed with a drink or food product. The amount to be admixed is preferably less than 50% by weight since an amount exceeding 50% by weight has an effect on the original taste of the drink or food product.

The present invention will be explained in detail in the following examples.

EXAMPLE 1

Hydrochloric acid whey (200 kg) was concentrated 10 times using a UF membrane having a cut-off molecular weight of 10 kDa (DK3840C, a product of Desalination) to obtain 180 kg of a permeate. Next, this permeate was concentrated 2 times using an RO membrane to obtain 80 kg of a concentrated liquid. Sodium lactate at the rates shown in Table 1 were added to a portion of 20 kg of this concentrated liquid, the temperature was increased to 50° C., and 1N sodium hydroxide was added to adjust the pH to 7.0. After 30 minutes, treatment with a clarifier was carried out to recover 0.7 kg of precipitate.

TABLE 1

|  | Sodium lactate added | (Unit: % by weight) Total lactic acid in concentrated liquid (as lactic acid) |
|---|---|---|
| Test product 1 | 0 | 0.004 |
| Test product 2 | 0.0075 | 0.01 |
| Test product 3 | 0.02 | 0.02 |
| Test product 4 | 0.06 | 0.05 |

The four kinds of precipitate thus obtained and a 15% by weight aqueous solution of a milk protein material DOMOVICTUS 300SP (a product of DOMO) were mixed to make a calcium concentration of 3.5% by weight of the total solid. The resulting admixture was homogenized at a pressure of 500 kg/cm$^2$ and spray-dried to obtain test products 1–4. These test products all contained 26.4% by weight protein, 3.39% by weight calcium, and 0.38% by weight sodium.

EXAMPLE 2

Hydrochloric acid whey (200 kg) was concentrated 10 times using a UF membrane having a cut-off molecular weight of 10 kDa (DK3840C, a product of Desalination) to obtain 180 kg of a permeate. Next, this permeate was concentrated 2 times using an RO membrane to obtain 80 kg of a concentrated liquid. Sodium lactate (0.06% by weight) was added to a portion of 15 kg of this concentrated liquid, the temperature was increased to the temperatures shown in Table 2, and 1N sodium hydroxide was added to adjust the pH to 7.0. After 30 minutes, treatment with a clarifier was carried out to recover a precipitate.

TABLE 2

|  | Temperature increase (° C.) |
|---|---|
| Test product 5 | 20 |
| Test product 6 | 30 |
| Test product 7 | 50 |
| Test product 8 | 80 |
| Test product 9 | 85 |

The five kinds of precipitate thus obtained and a 15% by weight aqueous solution of a milk protein material DOMOVICTUS 300SP (a product of DOMO) were mixed to make a calcium concentration of 3.5% by weight of the total solid. The resulting admixture was homogenized at a pressure of 500 kg/cm$^2$ and spray-dried to obtain test products 5–9. Compositions of these test products 5–9 are shown in Table 3.

TABLE 3

|  | Protein | Calcium | (Unit: % by weight) Sodium |
|---|---|---|---|
| Test product 5 | 25.4 | 3.39 | 0.33 |
| Test product 6 | 25.8 | 3.39 | 0.33 |
| Test product 7 | 26.4 | 3.39 | 0.38 |
| Test product 8 | 26.8 | 3.39 | 0.37 |
| Test product 9 | 27.2 | 3.39 | 0.32 |

Test Example 1

A 5% by weight aqueous solution of each of the test products 1–9 obtained in Examples 1 and 2 was prepared and the average diameter of particles in each aqueous solution was measured. A solution having an average particle diameter of less than 1 μm is presumed to be highly dispersible. Further, an organoleptic evaluation by 10 professional panelists was carried out. The evaluations were for "grittiness," "whey odor," and "general taste." "No grittiness," "no whey odor" and "good general taste" were marked as the highest scores on a maximum scale of 5 points, and the averages of the scores were taken to be evaluation scores. Results are shown in Table 4.

TABLE 4

|  | Average particle diameter (μm) | Grittiness | Whey odor | General taste |
|---|---|---|---|---|
| Test product 1 | 1.80 | 2.5 | 3.4 | 3.3 |
| Test product 2 | 1.43 | 3.7 | 4.2 | 3.9 |
| Test product 3 | 0.677 | 4.3 | 4.7 | 4.6 |
| Test product 4 | 0.266 | 4.7 | 4.9 | 4.8 |
| Test product 5 | 15.5 | 2.6 | 3.8 | 3.5 |
| Test product 6 | 0.875 | 4.3 | 4.2 | 4.4 |

TABLE 4-continued

|  | Average particle diameter (μm) | Grittiness | Whey odor | General taste |
|---|---|---|---|---|
| Test product 7 | 0.208 | 4.5 | 4.8 | 4.9 |
| Test product 8 | 0.734 | 4.1 | 4.2 | 4.3 |
| Test product 9 | 2.13 | 3.3 | 3.2 | 3.4 |

Results showed that the test products 3, 4, 6, 7, and 8 had average particle diameters of less than 1 μm and were highly dispersible. Further, results of the organoleptic evaluation showed that the test products 3, 4, 6, 7, and 8 had little grittiness and no whey odor and were highly dispersible and generally favorable. Namely, the evaluation showed that products had no whey odor and were highly dispersible and generally favorable when the lactic acid content of a permeate was 0.02% by weight or greater, and the temperature upon the pH adjustment was 30–80° C.

EXAMPLE 3

Hydrochloric acid whey (200 kg) was concentrated 10 times using a UF membrane having a cut-off molecular weight of 10 kDa (DK3840C, a product of Desalination) to obtain 180 kg of a permeate. Next, this permeate was concentrated 2 times using an RO membrane to obtain 80 kg of a concentrated liquid. Sodium lactate (0.06% by weight) was added to this concentrated liquid, the temperature was increased to 50° C., and 1N sodium hydroxide was added to adjust the pH to 7.0. After 30 minutes, treatment with a clarifier was carried out to recover 2.8 kg of precipitate.

The precipitate thus obtained and aqueous solutions of milk protein materials shown in Table 5 were mixed to make calcium concentrations (% by weight of the total solid) as shown in Table 5. The resulting admixture was homogenized at a pressure of 500 kg/cm² and spray-dried to obtain products 1–4 of the present invention.

TABLE 5

|  | Milk protein material | (Unit: % by weight) Concentration | Calcium |
|---|---|---|---|
| Product 1 of the present invention | DOMOVICTUS 300SP (a product of domo) | 15 | 3.5 |
| Product 2 of the present invention | skimmed milk powder (a product of snow brand milk products Co., Ltd) | 15 | 3.0 |
| Product 3 of the present invention | skimmed milk (a product of snow brand milk products co., Ltd) | — | 3.2 |
| Product 4 of the present invention | powdered material k for confectionery (a product of snow brand milk products co., Ltd) | 15 | 2.5 |

EXAMPLE 4

Lactic acid whey (300 kg) was concentrated 10 times using a UF membrane having a cut-off molecular weight of 10 kDa (DK3840C, a product of Desalination) to obtain 270 kg of a permeate. Next, this permeate was concentrated 3 times using an RO membrane to obtain 85 kg of a concentrated liquid. The temperature was increased to 50° C., and 1N sodium hydroxide was added to adjust the pH to 7.0. After 1 hour, treatment with a clarifier was carried out to recover 4.4 kg of precipitate.

The precipitate thus obtained and a 15% by weight aqueous solution of a milk protein material DOMOVICTUS 300HP (a product of DOMO) were mixed to make a calcium concentration of 5.0% by weight of the total solid. The resulting admixture was homogenized at a pressure of 500 kg/cm² and spray-dried to obtain product 5 of the present invention.

EXAMPLE 5

Hydrochloric acid whey (200 kg) was concentrated 10 times using a UF membrane having a cut-off molecular weight of 10 kDa (DK3840C, a product of Desalination) to obtain 180 kg of a permeate. Next, 0.02% by weight lactic acid was added to this permeate, then the temperature was increased to 50° C., and 1N sodium hydroxide was added to adjust the pH to 7.0. After 1 hour, treatment with a clarifier was carried out to recover 2.6 kg of precipitate.

The precipitate thus obtained and a 15% by weight aqueous solution of a milk protein material DOMOVICTUS 300SP (a product of DOMO) were mixed to make a calcium concentration of 4.0% by weight of the total solid. The resulting admixture was homogenized at a pressure of 500 kg/cm² and spray-dried to obtain product 6 of the present invention.

Compositions of the products 1–6 of the present invention obtained in Examples 3–5 are shown in Table 6

TABLE 6

|  | Protein | (Unit: % by weight) Calcium | Sodium |
|---|---|---|---|
| Product 1 of the present invention | 26.2 | 3.38 | 0.38 |
| Product 2 of the present invention | 28.7 | 2.90 | 0.37 |
| Product 3 of the present invention | 27.9 | 3.11 | 0.37 |
| Product 4 of the present invention | 10.6 | 2.46 | 0.22 |
| Product 5 of the present invention | 28.7 | 4.77 | 0.37 |
| Product 6 of the present invention | 25.7 | 3.80 | 0.37 |

Test Example 2

A 5% by weight aqueous solution of each of the products 1–6 of the present invention obtained in Examples 3, 4 and 5 was prepared. The measurement of average diameter of particles and organoleptic evaluation for each aqueous solution were carried out as described in Test Example 1. Further, as controls, a 5% by weight aqueous solution of each of milk calcium materials, i.e., Lactobal (a product of DMV; 6.3% by weight protein, 18.6% by weight calcium), Alamine (a product of New Zealand Dairy Industry; 10.3% by weight protein, 25.0% by weight calcium), and DOMOVICTUS 300MCA (a product of DOMO; 28.4% by weight protein, 3.4% by weight calcium) was prepared. Control products 1, 2 and 3 thus prepared were also subjected to the measurement of average diameter of particles and organoleptic evaluation.

Results are shown in Table 7.

TABLE 7

|  | Average particle diameter (μm) | Grittiness | Whey odor | General taste |
|---|---|---|---|---|
| Product of the present invention 1 | 0.203 | 4.5 | 4 | 4.3 |
| Product of the present invention 2 | 0.578 | 4.6 | 4.7 | 4.5 |

TABLE 7-continued

| | Average particle diameter (μm) | Grittiness | Whey odor | General taste |
|---|---|---|---|---|
| Product of the present invention 3 | 0.380 | 4.8 | 4.9 | 4.8 |
| Product of the present invention 4 | 0.200 | 4.4 | 4.1 | 4.3 |
| Product of the present invention 5 | 0.587 | 4.3 | 4 | 4.2 |
| Product of the present invention 6 | 0.250 | 4.3 | 4.2 | 4.3 |
| Control product 1 | 2.72 | 1.3 | 3.9 | 1.8 |
| Control product 2 | 15.4 | 1.6 | 3.8 | 1.6 |
| Control product 3 | 0.815 | 3.1 | 2.4 | 2.9 |

Results showed that the products 1–6 of the present invention had average particle diameters of less than 1 μm and were highly dispersible. On the other hand, control products 1 and 2 had average particle diameters of more than 1 μm and were poorly dispersible. Further, results of the organoleptic evaluation showed that the products 1–6 of the present invention had little grittiness and no whey odor and generally favorable taste. On the other hand, the control products 1, 2 and 3 were less preferable to the products 1–6 of the present invention in all evaluation criteria.

EXAMPLE 6

Skim milk powder (0.72 kg) was dissolved in 7.28 kg of warm water (40° C.) to prepare 8 kg of reconstituted fat-free milk. Milk calcium compositions of products 1–4 of the present invention obtained in Example 3 were each added to this reconstituted fat-free milk to make the calcium content 0.15% by weight and the admixtures were homogenized at a pressure of 100 kg/cm² to obtain calcium-fortified nonfat milk preparations (products 7–10 of the present invention).

Test Example 3

The measurement of average diameter of particles and organoleptic evaluation for the products 7–10 of the present invention obtained in Example 6 were carried out as described in Test Example 1. As controls, a calcium-fortified nonfat milk preparation mixed with each of milk calcium materials, i.e., Lactobal, Alamine and DOMOVICTUS 300MCA was prepared. Control products 4, 5 and 6 thus prepared were also subjected to the measurement of average diameter of particles and organoleptic evaluation.

Results are shown in Table 8.

TABLE 8

| | Average particle diameter (μm) | Grittiness | Whey odor | General taste |
|---|---|---|---|---|
| Product of the present invention 7 | 0.233 | 4.4 | 4.1 | 4.4 |
| Product of the present invention 8 | 0.608 | 4.4 | 4.5 | 4.5 |
| Product of the present invention 9 | 0.411 | 4.8 | 4.9 | 4.7 |
| Product of the present invention 10 | 0.237 | 4.3 | 4.2 | 4.3 |
| Control product 4 | 2.51 | 1.4 | 3.8 | 2.1 |
| Control product 5 | 12.9 | 1.1 | 3.3 | 1.9 |
| Control product 6 | 0.831 | 3.8 | 2.2 | 3.1 |

Results showed that the products 7–10 of the present invention had average particle diameters of less than 1 μm and were highly dispersible. On the other hand, control products 4 and 5 had average particle diameters of more than 1 μm and were poorly dispersible. Further, results of the organoleptic evaluation showed that the products 7–10 of the present invention had little grittiness and no whey odor and generally favorable taste. On the other hand, the control products 4, 5 and 6 were less preferable to the products 7–10 of the present invention in all evaluation criteria.

Effectiveness of the Invention

The present invention can provide a milk calcium composition which is highly dispersible and tasty, and a calcium-fortified drink or food product using this milk calcium composition without causing any problem in taste.

What is claimed is:

1. A method for producing a milk calcium composition which is highly dispersible and tasty, comprising the steps of:

obtaining a permeate containing lactic acid and lactic acid ion by treating whey with an ultrafiltration (UF) membrane or nanofiltration (NF) membrane;

adjusting the pH of the permeate to form and recover a slurry-like milk calcium preciptate, wherein the permeate contains lactic acid or lactate in a concentration of 0.02% or higher by weight as lactic acid to suppress formation of a hard apatite structure of milk calcium when forming the slurry-like milk calcium precipitate; and admixing and homogenizing the recovered slurry-like milk calcium precipitate with milk proteins to obtain a milk calcium composition.

2. The method as claimed in claim 1 wherein the pH is adjusted to 6.0–9.0 at 30–80° C.

3. The method as claimed in claim 1 wherein the milk calcium and the milk proteins are admixed to have a calcium content of 2.5–5.0% by weight of the total solid.

4. The method as claimed in claim 2 wherein the milk calcium and the milk proteins are admixed to have a calcium content of 2.5–5.0% by weight of the total solid.

* * * * *